United States Patent
Rehm

[11] Patent Number: 6,145,850
[45] Date of Patent: Nov. 14, 2000

[54] DIAPHRAGM CHUCK

[75] Inventor: Fritz Rehm, Oberteuringen, Germany

[73] Assignee: SMW Autoblok Spannsysteme GmbH, Meckenbeuren, Germany

[21] Appl. No.: 09/422,009

[22] Filed: Oct. 20, 1999

[30] Foreign Application Priority Data

Oct. 24, 1998 [DE] Germany .......................... 198 49 104
Apr. 28, 1999 [DE] Germany .......................... 199 19 408

[51] Int. Cl.[7] ................................................. B23B 31/32
[52] U.S. Cl. ......................... 279/139; 279/124; 279/130
[58] Field of Search .................................. 279/4.05, 130, 279/139, 2.05, 123, 124, 152, 153

[56] References Cited

U.S. PATENT DOCUMENTS

| | | | |
|---|---|---|---|
| 2,965,384 | 12/1960 | Lowe | 279/123 |
| 3,190,664 | 6/1965 | Hohwart et al. | 279/139 |
| 4,645,219 | 2/1987 | Link et al. | 279/130 |
| 4,667,972 | 5/1987 | Hiestand | 279/123 |
| 5,174,589 | 12/1992 | Gulde | 279/124 |
| 5,464,232 | 11/1995 | Chizmadia | 279/124 |

OTHER PUBLICATIONS

"The Chuck For Machining In The Future," Tobler, a Sandvik Company. Undated.

*Primary Examiner*—Steven C. Bishop
*Attorney, Agent, or Firm*—Pandiscio & Pandiscio

[57] ABSTRACT

In a diaphragm chuck (3) with clamping jaws (3) which are in a drivable connection with a deformable diaphragm (4) by means of jaw carriers (6) and in which counterweights (8) allocated to the clamping jaws (3) are inserted in the chuck body (2), the clamping jaws (3) are provided with axially aligned joining pieces (23) which are held in the counterweights (8). The clamping jaws (3) can be clamped together with the jaw carriers (4) and the diaphragm as well as with the counterweights (8) by means of quick clamping devices (31) which engage in the joining pieces (23).

This embodiment achieves a situation in which the clamping jaws (3) can be changed rapidly and in a straightforward procedure by releasing the quick clamping devices (31) by means of a tool which can be inserted radially from the outside into the chuck body (2). Furthermore, the clamping jaws (3), the jaw carriers (6) and the counterweights (8) form a unit which is chucked in itself, which possesses a high degree of rigidity and also no impurities can achieve ingress between these components.

16 Claims, 7 Drawing Sheets

DIAPHRAGM CHUCK

The present invention relates to a diaphragm chuck with clamping jaws inserted in a chuck body acting on a workpiece to be chucked, and located in a drivable connection with a diaphragm attached to the outer area of the end of the chuck body, with it being possible to deform the diaphragm by means of a centrally arranged, axially movable actuator via jaw carriers supported on the diaphragm.

A diaphragm chuck of this type is familiar from a brochure issued by Messrs. Tobler of 95380 Louvres, France and is sold by that company under the designation TMAD-ST. In that embodiment, the jaw carriers are provided with recesses into which the clamping jaws have to be clipped in order to connect the clamping jaws to the jaw carriers. When changing jaws, it is necessary to use a special tool to push back a detent pin which is movably held in counterweights, with the detent pin engaging in a conical hole worked into the clamping jaws and having to be pushed back against the force of a spring acting on the detent pin in order to allow the clamping jaws to be released from or clipped into the recesses. The clamping jaws have to be guided radially by hand when doing this, whilst at the same time the detent pin must be held pressed in order finally to be able to remove or insert the clamping jaws. As a result, the clamping jaws cannot be removed in the axial direction of the chuck. Also, because a stop ring for the workpiece being machined is screwed onto the chuck body, the lack of free available space makes the task of changing the jaws extremely difficult and time-consuming. Additionally, the installation conditions mean there is a high risk of accidents, particularly since diaphragm chucks are usually used in turning machines with vertically aligned workpieces so that the jaw change often has to be performed without visual monitoring and, to a certain extent, involves overhead working.

Furthermore, the diaphragm chuck of the prior art suffers from the disadvantage that the clamping jaws are only held in the jaw carriers by the force of the spring pressing on the detent pin, and that contamination is able to effect ingress between the jaw carriers and the top jaws because these components are only held in contact with one another by the force acting on the detent pin. In particular with projecting clamping jaws, it is no longer guaranteed that the clamping jaws will be centred on the outer radial recess, because support on the inner radial recess is required in such cases. Furthermore, manufacturing the recesses in the jaw carriers and the clamping jaws so they line up with one another correctly involves a considerable degree of production complexity, so that the diaphragm chuck of prior art requires a significant investment and must be operated with very great skill during a jaw change, which means it cannot be used flexibly.

The task of the present invention is therefore to configure a diaphragm chuck of the type mentioned initially in such a way that the jaws can be changed very rapidly without any problems arising thereby. The clamping jaws in this case should be released from or inserted into the chuck body by means of a movement parallel to the longitudinal axis of the chuck body, whilst it should be possible to manufacture the components which interact with one another in an economical fashion. However, it should above all be guaranteed that a workpiece can always be reliably chucked in the diaphragm chuck, irrespective of the jaw capacity of the clamping jaws and that no contamination can effect ingress between the components involved in the chucking operation so that a high degree of chucking accuracy is always assured and the diaphragm chuck can be used flexibly. Nevertheless, a secure and positionally accurate fixture of the clamping jaws onto the jaw carriers should be guaranteed at all times in conjunction with straightforward handling.

In accordance with the present invention, this is achieved in a diaphragm chuck of the type mentioned initially with counterweights assigned to the clamping jaws and engaging in recesses in the chuck body, in that each of the clamping jaws has a joining piece offset in the direction of the chuck body in an axial alignment with and axially parallel to the chuck body, with the joining pieces being held in recesses worked into the counterweights, and that the clamping jaws can be clamped together with the jaw carriers, the diaphragm and the counterweights by means of quick clamping devices which engage in the joining pieces and act in the axial direction of the joining pieces.

According to a different embodiment of a diaphragm chuck, however, the chuck can be given a particularly flat shape by having a joining piece formed onto each jaw carrier and projecting in the direction of the clamping jaw, with the joining piece engaging in an accommodation opening worked into the clamping jaws, and the clamping jaws can be clamped together with the jaw carriers or the joining pieces by quick clamping devices which are arranged in the clamping jaws and joining pieces and which act in their axial direction.

It is advantageous for the jaw carriers or the clamping jaws to possess an accommodation groove for the clamping jaws or the jaw carriers, respectively, which is formed, in a preferred embodiment, by guide gibs arranged laterally in the external edge zones of the jaw carriers or the clamping jaws, and for them to be provided with a contact surface on the side facing the diaphragm, this surface being shaped, in a preferred embodiment, as a circle, and serving to support on its inside jacket surface a projection in the shape of a circular ring protruding axially from the diaphragm.

In order to achieve a firm connection between the jaw carriers and the diaphragm and to fix the jaw carriers accurately in position over a long period, it is furthermore of advantage for each of the jaw carriers to be clamped together with the diaphragm by means of a clamping element which can be moved axially in relation to the jaw carriers and which acts on the outer jacket surface of the projection, in which case the clamping elements can take the form of a ring segment and should be equipped with a wedge surface which interacts with a corresponding counter-surface worked onto the jaw carrier.

Furthermore, it is advantageous for the joining pieces to be configured as a cylindrical shank and for the corresponding accommodation openings worked into the jaw carriers and the counterweights or clamping jaws to be configured as circular holes or as blind holes.

In addition, a stop ring protruding between the clamping jaws should be attached to the chuck body and the diaphragm should be supported against cams attached to the counterweights, support elements and/or jaw carriers on the surfaces facing the diaphragm in the area of the screws connecting them and/or the holes accommodating the joining pieces. Also, each of the jaw carriers should be circumferentially positioned by a pin inserted in the corresponding counterweight or support element and which engages in a recess in the jaw carrier which extends in a radial direction like a radial slot.

Furthermore, it is advantageous for each of the clamping jaws to be provided with a spring detent which engages in a circumferential groove worked in the joining pieces, with the result that the clamping jaws cannot come off the jaw carriers, e.g. under their own weight when the quick clamping devices are open.

In diaphragm chucks equipped with counterweights, each of the jaw carriers should be provided with a preferably central recess for accommodating the joining pieces formed onto the clamping jaws, and the counterweights should be equipped with a centring bush surrounding the accommodation openings worked into the counterweights, protruding in the direction of the jaw carriers and engaging at least partially in the jaw carriers. Also, each of the jaw carriers should be firmly connected to its associated counterweight by screws.

Each of the quick clamping devices can beneficially be made from a self-aligning pin which is held in a radially aligned hole in the joining pieces in such a way as to permit limited sliding movements, with the ends of the pins having a recessed or a projecting cone, and from two holding screws guided in diametrically opposed threaded holes in the counterweights or the clamping jaws, with these screws possessing a projecting cone or a recessed cone corresponding to the recessed cone or projecting cone of the self-aligning pin, and located with an axial offset in relation to the self-aligning pin by means of which the clamping jaws are pressed on.

If a diaphragm chuck is configured in accordance with the present invention, it is possible to change the clamping jaws in a very short time and in an extremely straightforward manner, without requiring any special tools and without leading to any difficulties. This is because during a jaw change, it is only necessary to release the quick clamping devices, e.g. using an Allen key which can be inserted radially from the outside into the chuck body, whilst moving the chuck body in the axial direction allows the joining pieces formed onto the clamping jaws to be pulled out of the counterweights and the jaw carriers which are firmly connected to the counterweights, or to remove the clamping jaws from the joining pieces which are formed onto the jaw carriers. When the joining pieces of differently configured clamping jaws are in turn inserted into the jaw carriers and the counterweights or differently configured clamping jaws are pushed onto the joining pieces of the jaw carriers, the quick clamping devices can be actuated, for example once again by means of a rotary movement, in order to complete a jaw change. This procedure does not require any particular precautions to be taken, neither is any dexterity required in order to release or actuate the interlocking parts of the joining pieces in the counterweights or the clamping jaws in the joining pieces.

The specially configured quick clamping devices mean that each of the clamping jaws, the jaw carriers and the counterweights form a unit which is chucked in itself, which means that a high degree of rigidity is assured between these components, no impurities can achieve ingress between them and there is no need to take account of restricted tolerances. As a result, a high level of clamping accuracy is assured at all times.

Furthermore, it is advantageous that the joining pieces of the clamping jaws or the jaw carriers which are configured as cylindrical pins and the corresponding holes worked into the jaw carriers as well as the counterweights or the clamping jaws can be manufactured to precise dimensions without difficulty and in an economical fashion, and that the quick clamping devices are made up of tried-and-tested components. As a result, inexpensive production is assured, whilst as a particular advantage, these components can be held in stock as prefabricated parts and it is only necessary to adapt the chucking surfaces of the clamping jaws to the individual workpiece which is to be clamped in them. As a result, the ability to make deliveries at short notice is always guaranteed.

With a simple design and configuration, the diaphragm chuck, the components of which are protected against contamination and which is configured in accordance with this proposal not only permits reproducible and precise chucking of a workpiece, but also makes it easily possible to adapt the chuck to differently shaped workpieces by means of changing the clamping jaws in an unproblematical procedure involving straightforward handling.

The drawing shows two sample embodiments of a diaphragm chuck configured in accordance with the present invention, the details of which are explained below. In the drawing.

Figure 1:
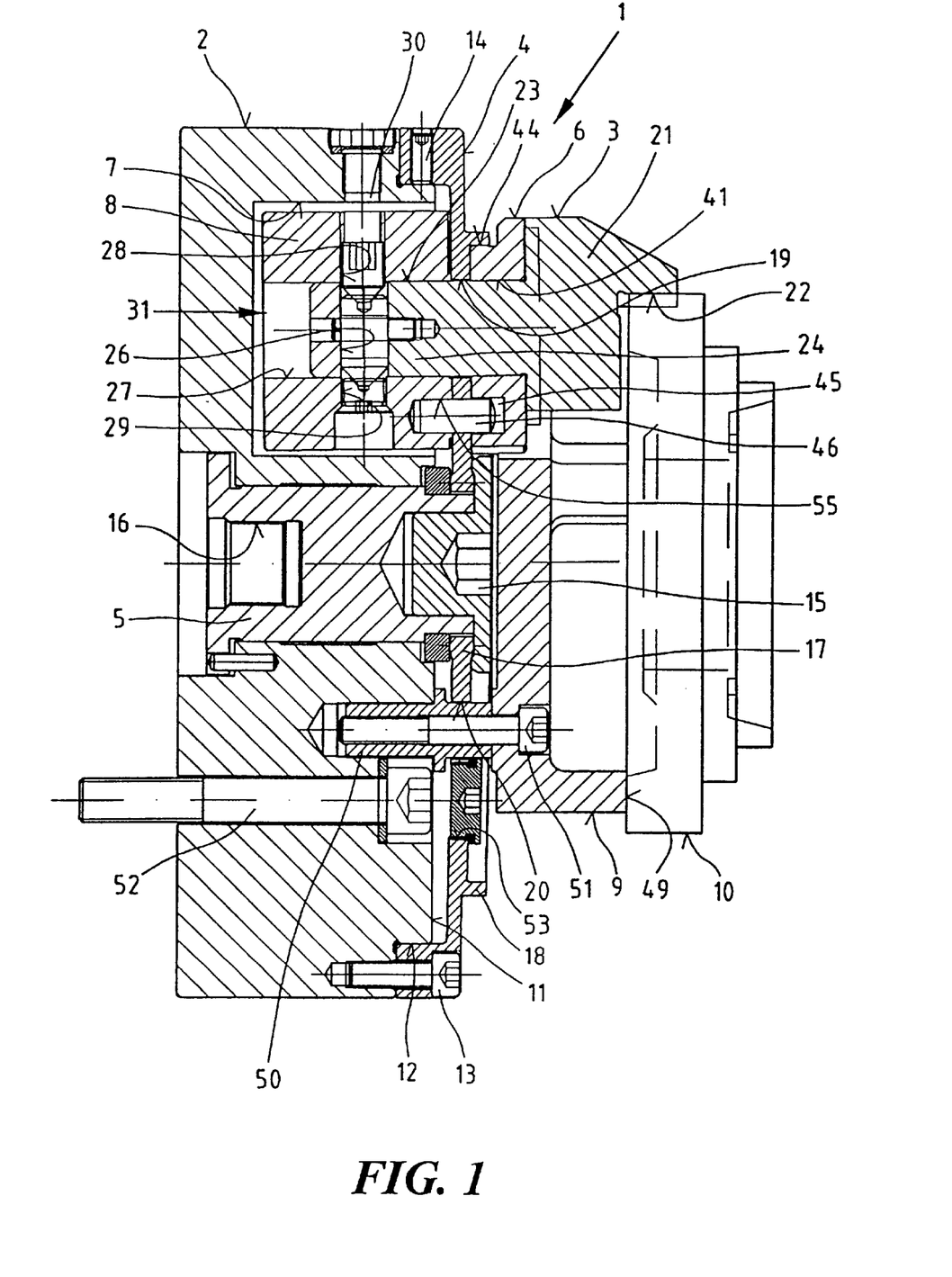
FIG. 1 shows a diaphragm chuck equipped with counterweights and with a workpiece clamped in it, as an axial section.

The diaphragm chuck shown in FIG. 1 and identified with I is used in particular for chucking high-quality workpieces 10, such as gears, and its principal components are clamping jaws 3 which are inserted in a chuck body 2, act on the workpiece 10 and are in a drivable connection with a deformable diaphragm 4 via jaw carriers 6, with the diaphragm 4 being made from a metallic material and attached to the end 11 of the chuck body 2 in its outer area by means of screws 13.

An actuator 5 is provided in order to actuate the diaphragm 4, with the actuator 5 having a thread 16 worked into it on the end facing away from the clamping jaws 3 and with an adjustable draw rod, which is not illustrated, actuated by a servo device screwed into the thread 16. The diaphragm 4 has a crowned collar 17 and is clamped onto the other end of the actuator 5 by means of a screw 15. Screws 14 enable the diaphragm 4, which is inserted into a ring shaped recess 12 in the chuck body 2, to be adjusted.

Furthermore, counterweights 8 allocated to the clamping jaws 3 are inserted into recesses 7 worked into the chuck body 2, with the counterweights 8 counteracting the centrifugal forces generated by the clamping jaws 3 when the diaphragm chuck 1 rotates and being connected to the clamping jaws 3, which are equipped with chucking surfaces 22, by means of joining pieces 23 formed onto the clamping heads 21 of the clamping jaws 3, with the connection being a fixed one yet capable of being released by means of quick clamping devices 31. To this end, the joining pieces 23 formed as cylindrical shanks 24 pass through holes 41 worked in the jaw carriers 6 and recesses 19 provided in the diaphragm 4 and penetrate into holes 27 worked into the counterweights 8, with it being possible to lock the joining pieces 23 into the holes 27 by means of the quick clamping devices 31.

Figure 4:
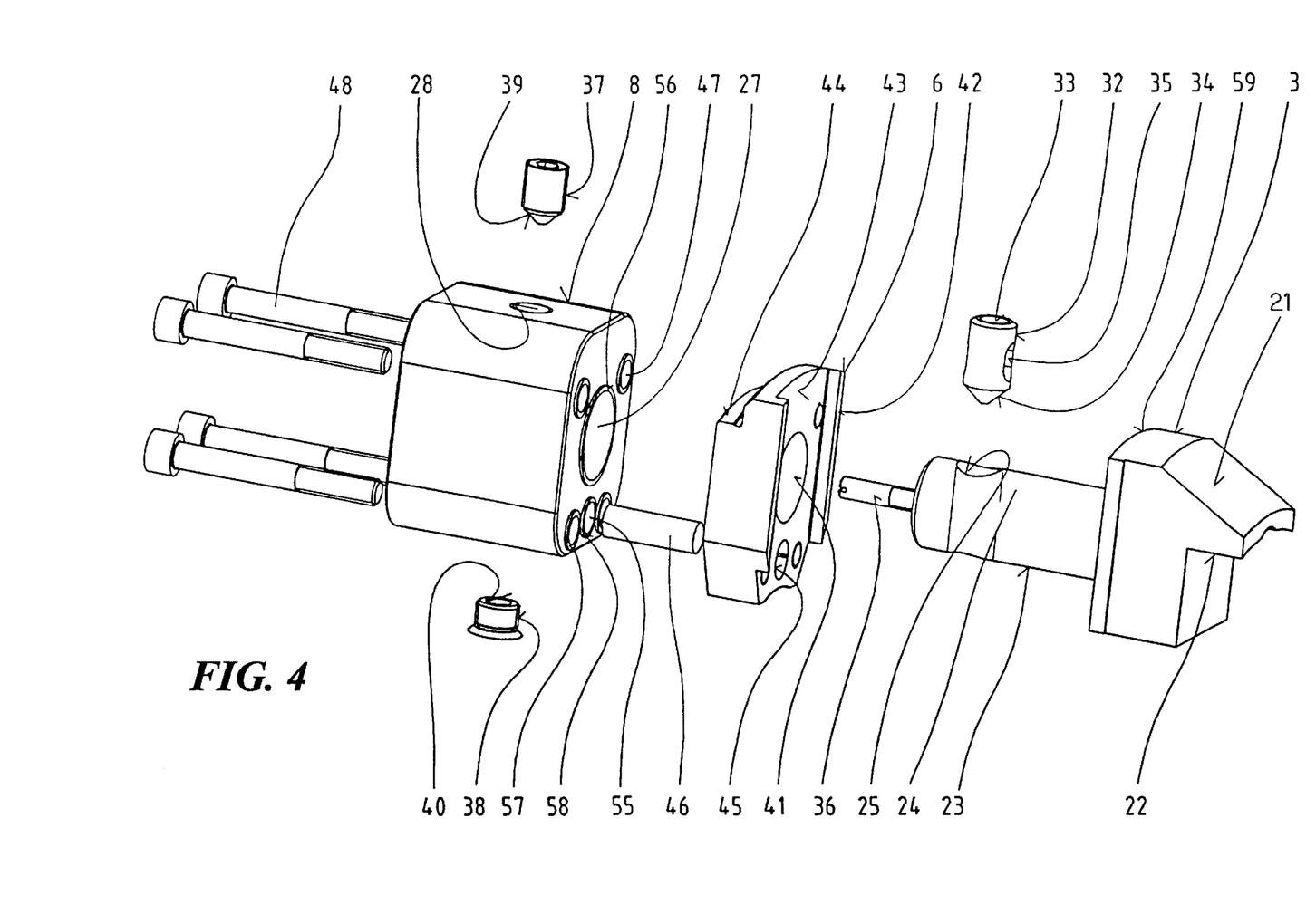
FIG. 4 shows a clamping jaw with jaw carrier and counterweight as well as the corresponding components of the diaphragm chuck in accordance with FIG. 1, as an exploded view.

The counterweights 8 are firmly connected to the jaw carriers 6 by means of screws 48 which pass through the diaphragm 4 and the jaw carriers 6 are provided with gibs 42 attached at the sides in order to guide the clamping jaws 3 with the effect that an accommodation groove 43 is formed for the clamping jaws 3. Furthermore, as can be seen in particular in FIG. 4, a contact surface 44 is worked onto the clamping jaws 3 for radial support of the same and a circumferential projection 18 is formed onto the diaphragm 4 with which the clamping jaws are in contact. A pin 46 is inserted in each of the holes 55 in the counterweights 8 for positioning in the circumferential direction, with the pin 46 engaging in a recess 45 worked into the jaw carrier 6 and configured as a radial slot.

Figure 5:
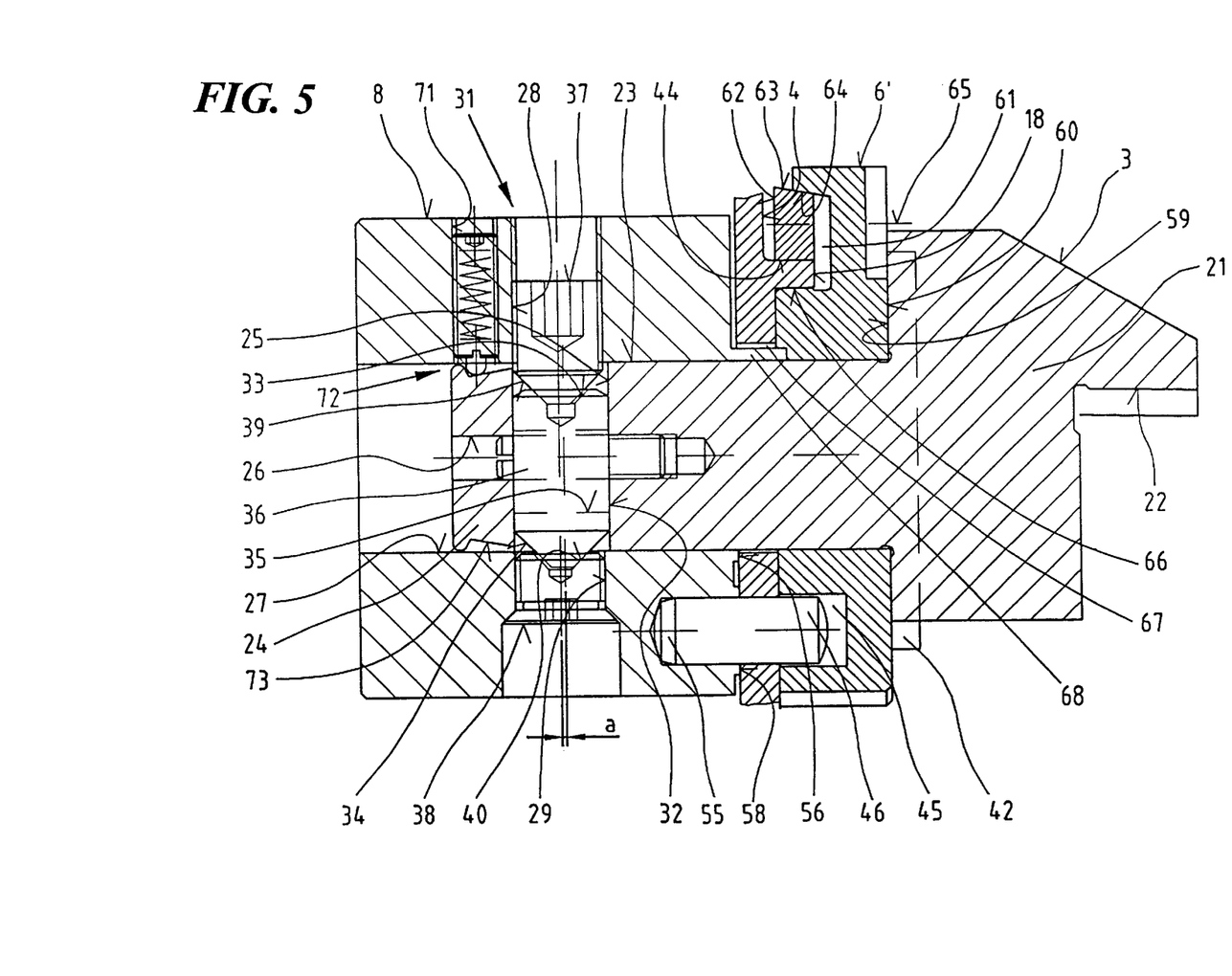
FIG. 5 shows a section of the modified diaphragm chuck in accordance with FIG. 1 with a clamping element for clamping the jaw carrier against the diaphragm, as a magnified view.

As can be seen in particular in FIG. 5, each of the quick clamping devices 31 is formed by a self-aligning pin 32 which has a limited range of radial movement and by two holding screws 37 and 38, which are axially offset in relation to one another when installed in order to generate a force acting in the axial direction of the joining pieces 23. To this end, the self-aligning pins 32 are inserted in holes 25 worked into the joining pieces 23, whilst the holding screws 37 or 38 are screwed into threaded holes 28 or 29 worked into the counterweights 8. Furthermore, each of the self-aligning pins 32 is provided with a recessed cone 33 and a projecting cone 34 which interact with a projecting cone 39 or a recessed cone 40 worked onto the holding screws 37 or 38. Threaded holes 26 are worked into the joining pieces 23 order to hold the self-aligning pins 32 in the joining pieces 23, and the self-aligning pins 32 are equipped with slots 35 into which pins 36 screwed into the threaded holes 26 engage.

The quick clamping devices 31 function in that the holding screws 37, which can be accessed by means of holes 30 provided in the chuck body 2 flush with the threaded holes 28, are screwed into the recessed cone 33 of the self-aligning pins 32, e.g. using an Allen key, causing the projecting cone 34 of the self-aligning pins 32 to be braced against the recessed cone 40 of the holding screws 38 with the effect that the inclined surfaces cause a force to be created acting in the axial direction of the joining pieces 23 and the clamping jaws 3 are pressed against the jaw carriers 6. It is a precondition of this, however, that the self-aligning pins are located with a slight axial offset "a" in relation to the holding screws 37 and 38. This is achieved by having the axes of the holes 25 accommodating the self-aligning pins 32 angled towards the diaphragm 4 when the surface 59 of the clamping heads 21 is in contact with the corresponding surfaces 60 of the jaw carriers 6, and offset in relation to the axes of the threaded holes 28 and 29 into which the holding screws 37 and 38 are screwed, with the effect that when each of the approximate halves of the holding screws 37 and 38 comes into contact with the diametrically opposed self-aligning pins 32 the resulting effect is to thrust the joining pieces 23 in an axial direction, thereby establishing the chucking force.

If the holding screws 37 are unscrewed far enough so they no longer engage in the corresponding joining pieces 23, the clamping jaws 3 can be released by an axial movement of the chuck body 2 and replaced.

Figure 2:
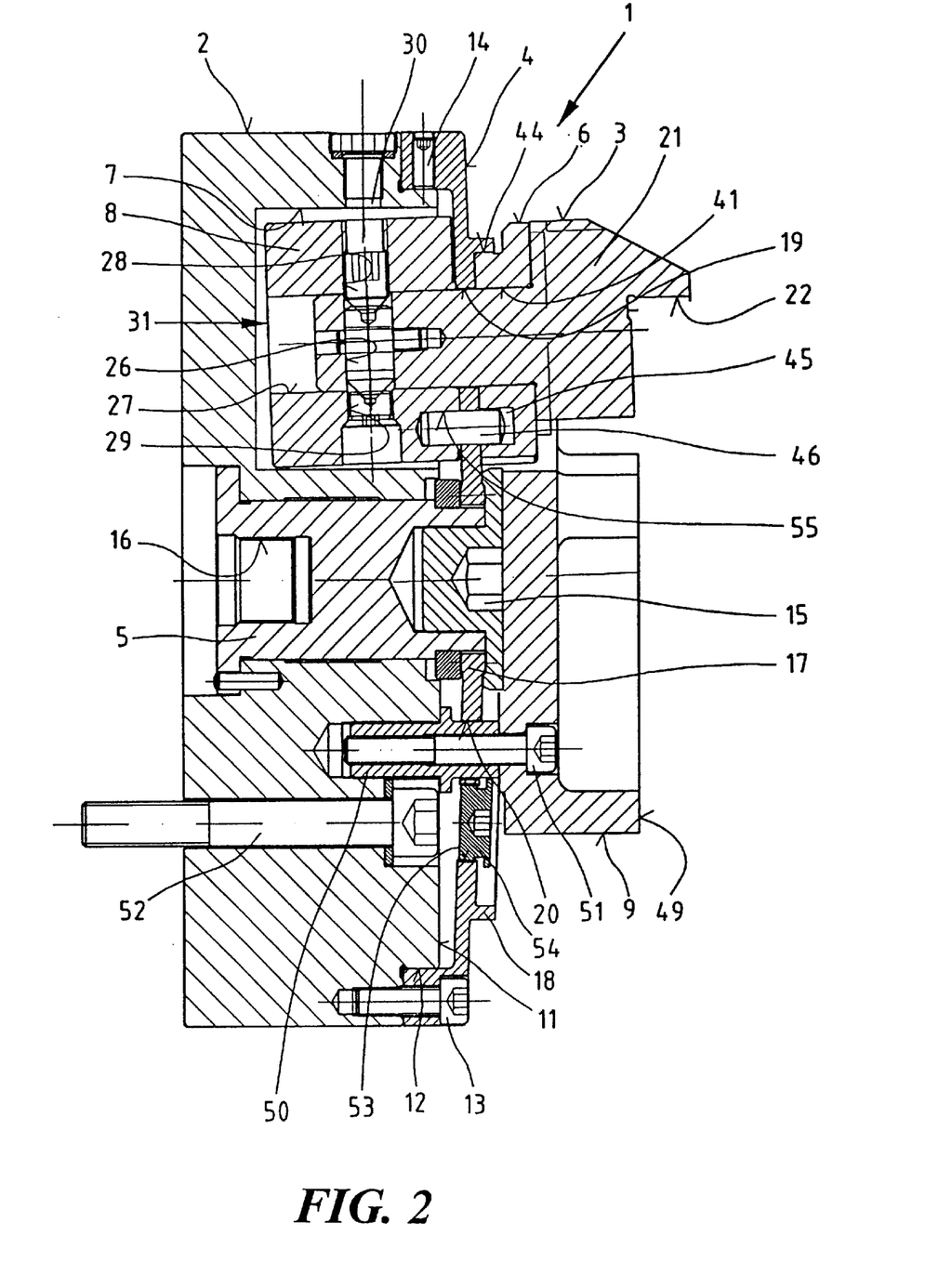
FIG. 2 shows the diaphragm chuck in accordance with FIG. 1 with opened clamping jaws.

The diaphragm 4 must be moved into the position shown in FIG. 2 by means of the actuator 5 in order to clamp the workpiece 10 between the clamping jaws 3. This involves bending the diaphragm 4 open and the components which are in contact with the diaphragm 4, namely the jaw carrier 6 and the counterweights 8, are swivelled together with the clamping jaws 3 inserted therein with the effect that the clamping jaws 3 are opened and the workpiece 10 can be inserted. If the force applied to the actuator 5 is released, the diaphragm 4 returns to the position shown in FIG. 1 and the workpiece 10 is held by means of the clamping force exerted by the flexibly deformable diaphragm 4.

In order to prevent the diaphragm 4 becoming fixedly clamped between the jaw carriers 6 and the counterweights 8 which are screwed together and thereby having its bending capability impaired, projections 57 or 58 or 56 are worked onto the diaphragm 4 in the area of the holes 47 or 55 which accommodate the screws 48 and the pins 46 and also in the area around the hole 27, with the diaphragm 4 only making contact with the projections 57 or 58 or 56 according to their surface, with the result that the deformation of the diaphragm 4 is not inhibited.

Figure 3:
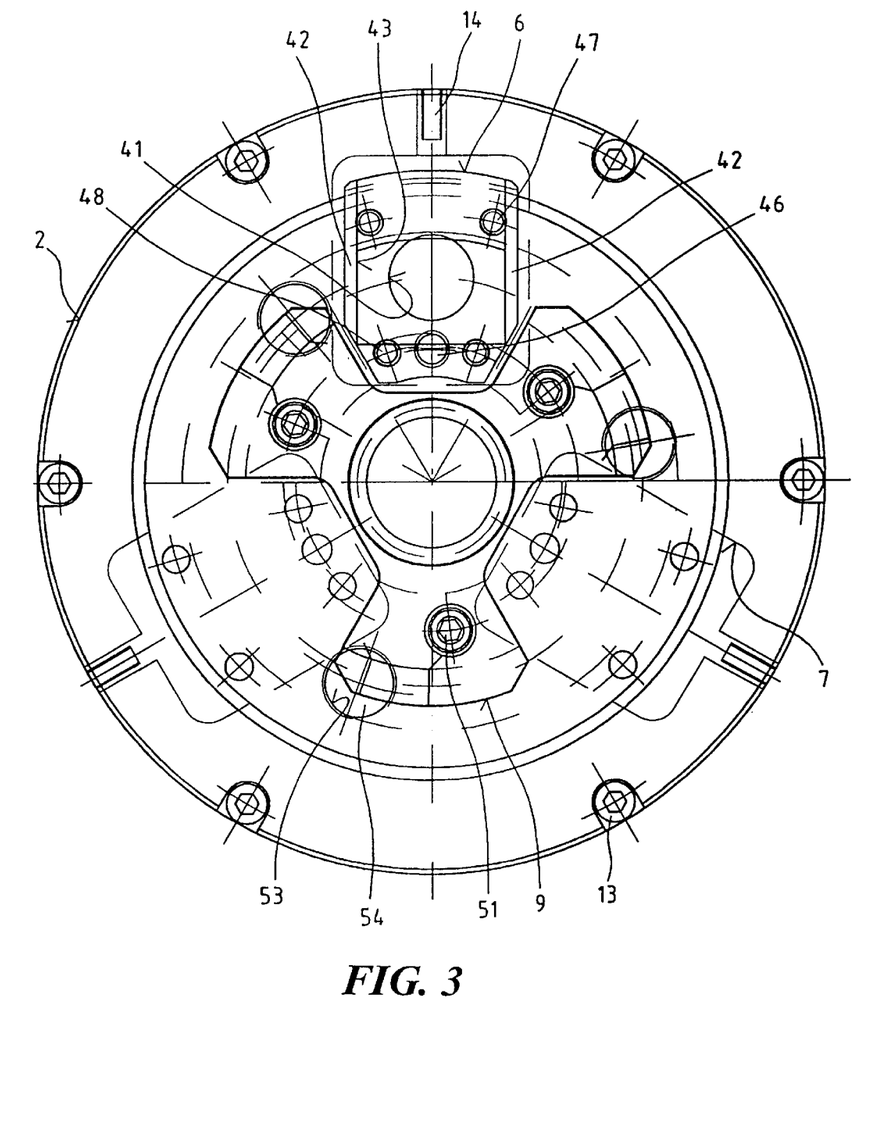
FIG. 3 shows a front view of the diaphragm chuck in accordance with FIG. 1, without a workpiece.

Furthermore, in order to support the workpiece 10, a three-armed stop ring 9 is attached to the chuck body 2, with the stop ring 9 protruding between the clamping jaws 3, as can be seen in FIG. 3, and having contact surfaces 49. Sleeves 50 are screwed into the chuck body 2 in order to hold the stop ring 9, with the sleeves 50 projecting through corresponding recesses 20 worked into the diaphragm 4 and to which the stop ring is attached by means of screws 51. The chuck body 2 of the diaphragm chuck 1 can be fixed onto a machine tool by means of further screws 52, which can be accessed by means of holes 53 worked into the diaphragm 4 and closed by plugs 54.

Figure 6:
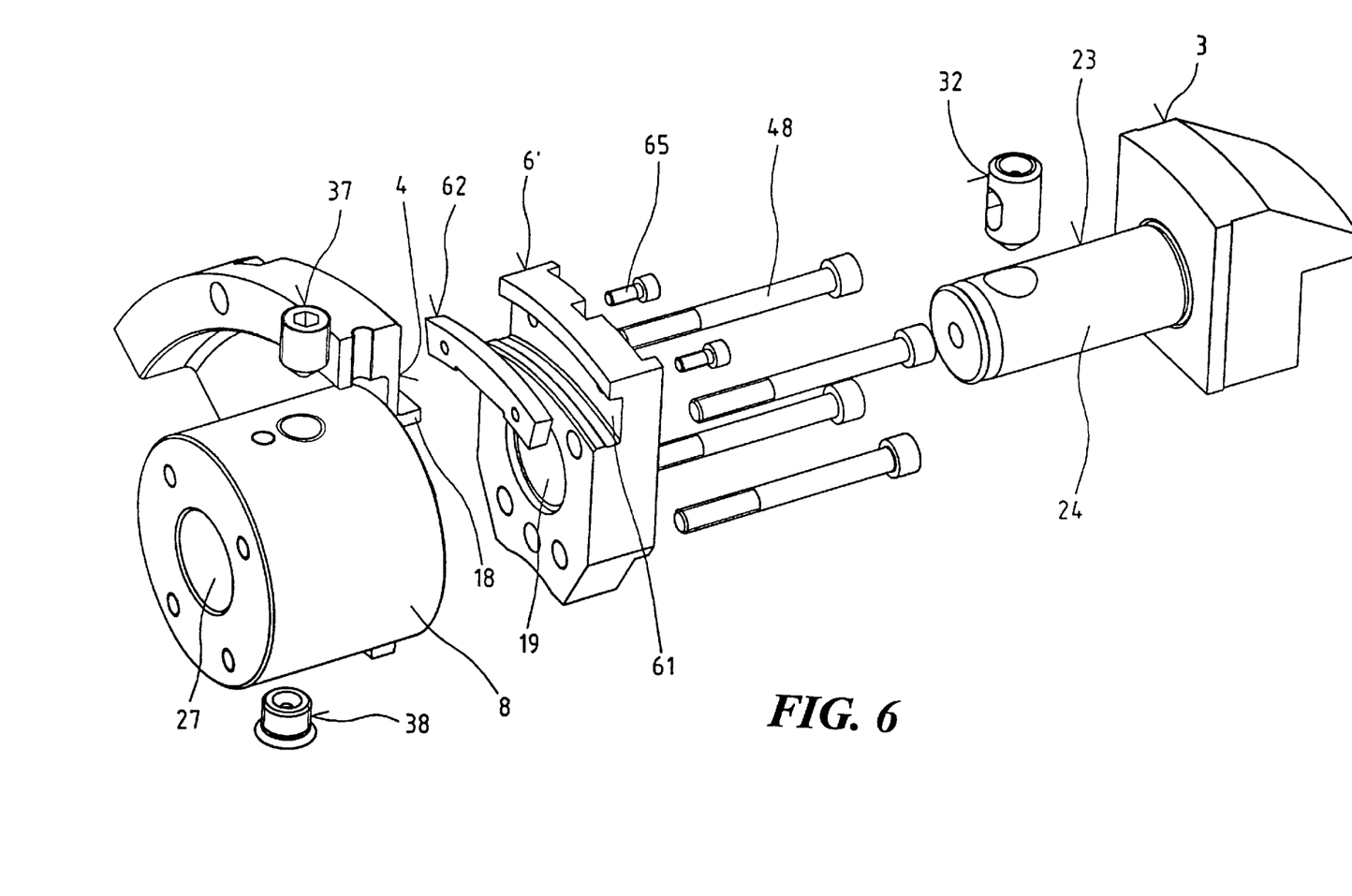
FIG. 6 shows the sample embodiment of the diaphragm chuck in accordance with FIG. 5, in a perspective representation

As can be seen in FIGS. 5 and 6, clamping elements 62 are provided in each recess 61 in the jaw carrier 6' in order to be able to clamp the jaw carriers 6' firmly onto the diaphragm 4 and thereby fix the position of the jaw carriers 6', with the clamping elements 62 having the form of ring segments and possessing wedge surfaces 63. Counter surfaces 64 assigned to these are worked onto the jaw carriers 6' and, by means of bolts 65, the clamping elements 62 can be adjusted axially towards the jaw carriers 6', with the effect that the surface 44 of the projection 18 on the diaphragm 4 is pressed against the contact surface 66 of the jaw carriers 6'. As a result, the jaw carriers 6' are centred on the projection 18 with positional orientation and thus fixed onto the diaphragm 4. As a result, even micro-movements do not give rise to any displacements of the jaw carriers 6', which could otherwise lead to inaccuracies during chucking operations, and the jaw carries 6' are always aligned precisely.

In order to facilitate the assembly of the clamping jaws 3 of the diaphragm chuck 1, as can also be seen in FIG. 5, a centring bush 68 is formed onto each of the counterweights 8, with the centring bush 68 surrounding the hole 27 worked into the counterweights 8 and engaging in a recess 67 worked into the jaw carriers 6'. Furthermore, spring detents 72 inserted in threaded holes 71 are provided in the counterweights 8, with the spring detents 72 engaging in circumferential grooves 73 worked into the joining pieces 23. The clamping jaws 3 therefore remain in position even when the quick clamping devices 31 are released.

Figure 7:
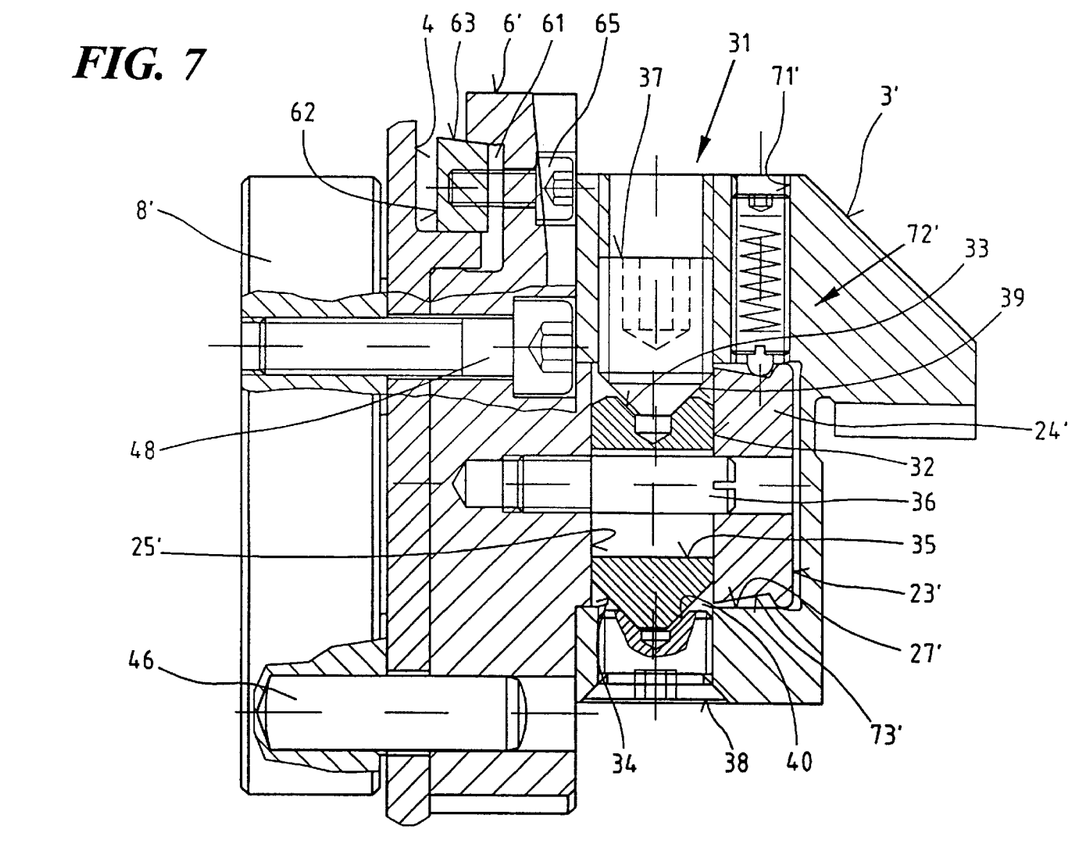
FIG. 7 shows a section from a diaphragm chuck in accordance with FIG. 5 with joining pieces formed onto the top jaws for holding the clamping jaws.

In the embodiment shown in FIG. 7, in order to connect the clamping jaws 3' to the jaw carriers 6' in a releasable connection, each of the jaw carriers 6' has a joining piece 23' formed onto it in the shape of a cylindrical pin 24', whilst accommodation openings 27 in the form of blind holes are worked into the clamping jaws 3', with the joining pieces 23' engaging in the accommodation openings 27. The clamping jaws 3' can be clamped onto the joining pieces 23', and therefore onto the jaw carriers 6', by means of quick clamping devices 31 which act in the axial direction of the joining pieces 23'. Each of the jaw carriers 6' is clamped against disc shaped support elements 8' by means of screws 48, with the effect that a diaphragm chuck with a flat configuration is produced, in particular also due to the joining pieces 23' formed onto the jaw carriers 6'.

Furthermore, the clamping jaws 3' are provided with spring detents 72' inserted in threaded holes 71', with the detents 72' engaging in circumferential grooves 73' formed into the joining pieces 23'. The clamping jaws 3' can therefore be held on the joining pieces 23' when the quick clamping devices 31 are released, even when the diaphragm chuck 1 is installed in a vertical alignment, and the clamping jaws 3' can only be removed by overcoming the holding force of the spring detent 72'.

What is claimed is:

1. A diaphragm chuck (1) with clamping jaws (3) inserted in a chuck body (2) adapted to act on a workpiece (10), and in drivable connection with a diaphragm (4) attached to an outer area of an end (11) of the chuck body (2), to deform the diaphragm (4) by means of a centrally arranged, axially movable actuator (5) via jaw carriers (6) supported on the diaphragm (4);

wherein said diaphragm chuck (1) is provided with counterweights (8) attached to the clamping jaws (3) and engaging in recesses (7) in the chuck body (2), each of the clamping jaws (3) having a joining piece (23) offset in a direction of the chuck body (2) in axial alignment with and axially parallel to the chuck body (2), with the joining pieces (23) being held in openings (27) in the counterweights (8), and wherein the clamping jaws (3) are adapted to be clamped together with the jaw carriers (6), the diaphragm (4) and the counterweights (8) by means of quick clamping devices (31) which engage in the joining pieces (23) and which act in the axial direction of the joining pieces (23).

2. The diaphragm chuck in accordance with claim 1, wherein at least one of the jaw carriers (6) and the clamping jaws (3) is provided with a groove (43) which is formed by guide gibs (42) arranged laterally in external edge zones of at least one of the jaw carriers (6) and the clamping jaws (3).

3. The diaphragm chuck in accordance with claim 1, wherein the jaw carriers (6) are provided with a contact surface (44) on a side facing the diaphragm (4), said surface (44) being shaped, as a circle, and serving to support on an inside jacket surface (66) a projection (18) in the shape of a circular ring protruding axially from the diaphragm (4).

4. The diaphragm chuck in accordance with claim 3, wherein each of the jaw carriers (6') is adapted to be clamped together with the diaphragm (4) by means of a clamping element (62) which is movable axially in relation to the jaw carriers (6') and which acts on the outer jacket surface of the projection (18).

5. The diaphragm chuck in accordance with claim 4, wherein each of the clamping elements (62) comprises a ring segment and is equipped with a wedge surface (63) which interacts with a corresponding countersurface (64) on the jaw carrier (6').

6. The diaphragm chuck in accordance with claim 1, wherein a stop ring (9) protrudes between the clamping jaws (3) and is attached to the chuck body (2).

7. The diaphragm chuck in accordance with claim 1, wherein each of the jaw carriers (6) is provided with a central recess (41) for accommodating the joining pieces (23) formed on the clamping jaws (3).

8. The diaphragm chuck in accordance with claim 1, wherein each of the counterweights (8) is equipped with a centering bush (68) surrounding the openings (27) in the counterweights (8), said bush protruding in a direction of the jaw carriers (6) and engaging at least partially in the jaw carriers (6).

9. The diaphragm chuck in accordance with claim 1 wherein each of the jaw carriers (6) is connected to an associated counterweight (8) by screws (47).

10. A diaphragm chuck (1) with clamping jaws (3') inserted in a chuck body (2) adapted to act on a workpiece (10) and in drivable connection with a diaphragm (4) attached to an outer area of an end (11) of the chuck body (2), to deform the diaphragm (4) by means of a centrally arranged, axially movable actuator (5) via jaw carriers (6') supported on the diaphragm (4), wherein a joining piece (23') is formed onto each jaw carrier (6') protruding in the direction of the clamping jaw (3'), with said joining piece (23') engaging in an opening (27') in the clamping jaw (3'), and wherein the clamping jaws (3') are adapted to be clamped onto the jaw carrier (6') and the joining pieces (23') by quick clamping devices (31) arranged in the clamping jaws (3') and on the joining pieces (23') and which act in the axial direction of the clamping jaws (3') and the joining pieces (23'), and wherein each of the clamping jaws (3, 3') is provided with a spring detent (72, 72') which engages in a circumferential groove (73, 73') in each of the joining pieces (23').

11. The diaphragm chuck in accordance with claim 10, wherein the joining pieces (23, 23') are each configured as a cylindrical shank (24, 24') and corresponding openings (41, 27 or 27') in at least a selected one of the jaw carriers (6) and counterweights (8) and the clamping jaws (3') are configured as at least one of circular holes and blind holes.

12. The diaphragm chuck in accordance with claim 11 wherein the diaphragm (4) is supported against cams (58) attached to at least a selected one of counterweights (8), support elements (8') and jaw carriers (6) on surfaces thereof facing the diaphragm (4) in an area of screws (47) connecting said cams and the holes (27; 41) accommodating the joining pieces (23).

13. The diaphragm chuck in accordance with claim 12, wherein each of the jaw carriers (6) is circumferentially positioned by a pin (46) inserted in a selected one of a corresponding counterweight (8) and a support element (8') and which engages in a recess (45) in the jaw carrier (6) which extends in a radial direction.

14. The diaphragm chuck in accordance with claim 10, wherein each of the quick clamping devices (31) is made from a self-aligning pin (32) which is held in a radially aligned hole in the joining pieces (23, 23') in such a way as to permit limited sliding movements, with ends of the pins (32) having a selected one of a recessed cone (33) and a projecting cone (34), and from two holding screws (37, 38) guided in diametrically opposed threaded holes (28, 29) in a selected one of counterweights (8) and the clamping jaws (3'), with said screws (37, 38) possessing a selected one of a projecting cone (39) and a recessed cone (40) corresponding to the recessed cone (33) or projecting cone (34) of the self-aligning pin (32), and located with an axial offset in relation to the self-aligning pin (32) by means of which the clamping jaws (3, 3') are pressed on.

15. A diaphragm chuck comprising clamping jaws (3) inserted in a chuck body (2) adapted to act on a workpiece (10), and in drivable connection with a diaphragm (4) attached to an outer area of an end (11) of the chuck body (2), to deform the diaphragm (4) by means of a centrally arranged, axially movable actuator (5) via jaw carriers (6) supported on the diaphragm (4); wherein said diaphragm chuck (1) is provided with counterweights (8) attached to the clamping jaws (3) and engaging in recesses (7) in the chuck body (2), each of the clamping jaws (3) having a joining piece (23) offset in a direction of the chuck body (2) in axial alignment with and axially parallel to the chuck body (2), with the joining pieces (23) being held in openings (27) in the counterweights (8), and wherein the clamping jaws (3) are adapted to be clamped together with the law carriers (6), the diaphragm (4) and the counterweights (8) by means of quick clamping devices (31) which engage in the joining pieces (23) and which act in the axial direction of the joining pieces (23) and wherein each of the clamping jaws (3, 3') is provided with a spring detent (72, 72') which engages in a circumferential groove (73, 73') in each of the joining pieces (23').

16. A diaphragm chuck comprising:

a chuck body;

clamping jaws mounted in said chuck body and adapted to engage and retain a workpiece;

a diaphragm mounted on an end of said chuck body;

jaw carriers connected to said diaphragm;

an actuator axially movable relative to said jaw carriers to deform said diaphragm; wherein a joining piece extends from each of said jaw carriers in a direction toward one of said clamping jaws, said joining piece being adapted to enter an opening in one of said clamping jaws, and quick clamping devices, each arranged in one of said clamping jaws and on one of said joining pieces, and which are movable in an axial direction toward said one clamping jaw and said one joining piece to lock the clamping jaws on said jaw carriers and said joining pieces.

* * * * *